United States Patent
Singer

(10) Patent No.: US 8,336,336 B2
(45) Date of Patent: Dec. 25, 2012

(54) DANNER PIPE

(75) Inventor: Rudolf Singer, Engelstadt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1027 days.

(21) Appl. No.: 10/577,632

(22) PCT Filed: Oct. 29, 2004

(86) PCT No.: PCT/EP2004/012285
§ 371 (c)(1),
(2), (4) Date: Dec. 21, 2006

(87) PCT Pub. No.: WO2005/049512
PCT Pub. Date: Jun. 2, 2005

(65) Prior Publication Data
US 2007/0087194 A1 Apr. 19, 2007

(30) Foreign Application Priority Data
Oct. 30, 2003 (EP) .................................. 03025007

(51) Int. Cl.
*C03B 15/14* (2006.01)
(52) U.S. Cl. ............. 65/352; 66/353; 66/374.12; 66/86
(58) Field of Classification Search ............. 65/86, 89, 65/374.12, 352, 353, 66, 75
See application file for complete search history.

(56) References Cited

U.S. PATENT DOCUMENTS

| | | | | |
|---|---|---|---|---|
| 2,464,028 A | * | 3/1949 | Danner | 65/187 |
| 2,583,431 A | | 1/1952 | Laidig et al. | |
| 3,236,619 A | * | 2/1966 | Frye et al. | 65/184 |
| 3,269,821 A | | 8/1966 | Vatterod | |
| 3,364,004 A | * | 1/1968 | Cozine et al. | 65/187 |
| 6,595,029 B1 | * | 7/2003 | Dick et al. | 65/86 |
| 6,679,085 B1 | * | 1/2004 | Singer et al. | 65/162 |
| 2004/0025540 A1 | * | 2/2004 | Dick et al. | 65/187 |

FOREIGN PATENT DOCUMENTS

| | | |
|---|---|---|
| DE | 454 877 | 1/1928 |
| EP | 1 072 569 A | 1/2001 |
| FR | 2 130 174 A | 3/1972 |
| GB | 2 376 684 A | 12/2002 |
| JP | 11 322350 A | 11/1999 |

OTHER PUBLICATIONS

International Search Report Feb. 10, 2005.
Written Opinion Feb. 17, 2005.

* cited by examiner

*Primary Examiner* — Queenie Dehghan
(74) *Attorney, Agent, or Firm* — Kalow & Springut LLP

(57) ABSTRACT

The present invention relates to a mandrel for producing glass tubes or rods, particularly for the Vello process, the A-drawing process and preferably for the Danner process. The mandrel comprises a body (1) of a ceramic composite material, and an external metal material jacket (2) surrounding at least a portion of said body, wherein the ceramic composite material has a substantially similar thermal expansion coefficient as the metal material of said jacket. Alternatively the mandrel comprises a self-supporting metal material jacket (22).

13 Claims, 2 Drawing Sheets

DANNER PIPE

BACKGROUND OF THE INVENTION

The present invention relates to a mandrel for producing glass tubes or rods, particularly for the Vello process, the A-drawing process and preferably for the Danner process.

A common used process for manufacturing glass tubes or rods is the Vello process. The glass melt flows from an oven into a bowl in which a hollow vertical mandrel, the Vello needle, is mounted, or a bell surrounded by an orifice ring. The glass flows through the annular space between the bell and the ring and travels over a line of rollers to a drawing machine. Tubing is made by blowing air through a bell with a hollow tip and rod is produced by using a bell with a solid tip. The tube firstly flows vertically downwards, is then diverted horizontally and drawn off mechanically via a gravity-roller conveyor (as in the Danner process) cooled and cut to length.

In the A-drawing process (down-draw process), the glass melt already flows in tube form from the feeder, since it exits through a cylindrical form. It flows over the drawing tool, a mandrel, here an A-drawing needle, where the glass is formed into a tube. In this process, the operation can be performed with air. The tube flows vertically downward and is cut to length without deflection at temperatures of about 300° C.

The Danner Process was developed for the continuous production of glass tubing and rod. In the Danner process, a slightly tilted, slowly rotating tube, the Danner mandrel, on which a continuous strand of glass melt accumulates, is used as a drawing tool. At the lower end of the mandrel, the head of the mandrel, the glass is drawn off under the formation of a tube, whereby a cavity is formed by supplying air or gas through the hollow shaft of the mandrel. After deflection to the horizontal, the solidified tube passes through a gravity-roller conveyor to the drawing machine, behind which separation into tube sections is carried out by chopping. A further coating of the inner side of the tube is described for example in the U.S. Pat. No. 6,595,029, which relates to a coated mandrel and which is herewith incorporated by reference.

Since the above described processes operate at very high temperatures, the mandrel has to be heat-resistant. Furthermore, the temperature gradient between the rear end of the mandrel, particularly the Danner blowpipe, where the glass is dispensed on the mandrel and the front end where the glass is removed or pulled away is in the range of 300-400K. Typical ceramic mandrels or mandrels with a ceramic surface provide only a very short lifetime which depends on the glass type and the processing temperature. Furthermore, the use of ceramic mandrels can impure the glass tubes. Alternatives, with ceramic mandrels coated or covered with stainless steel lead to high stressing forces between the different materials, which may result in buckling or warping of the surface, especially for composite products with different thermal expansion coefficients

SUMMARY OF THE INVENTION

It is therefore an object of the invention to provide an improved mandrel and a respective method. This object is achieved with the features of the respective claims.

It is an advantage to provide a mandrel with a metal surface comprising platinum materials which are heat resistant, wherein undesired stressing forces due to different thermal expansions are avoided.

BRIEF DESCRIPTION OF THE FIGURES

The present invention will be further described with reference to the accompanying figures wherein like parts have the same reference signs, wherein.

DETAILED DESCRIPTION OF THE PREFERRED EMBODIMENTS

Figure 1:
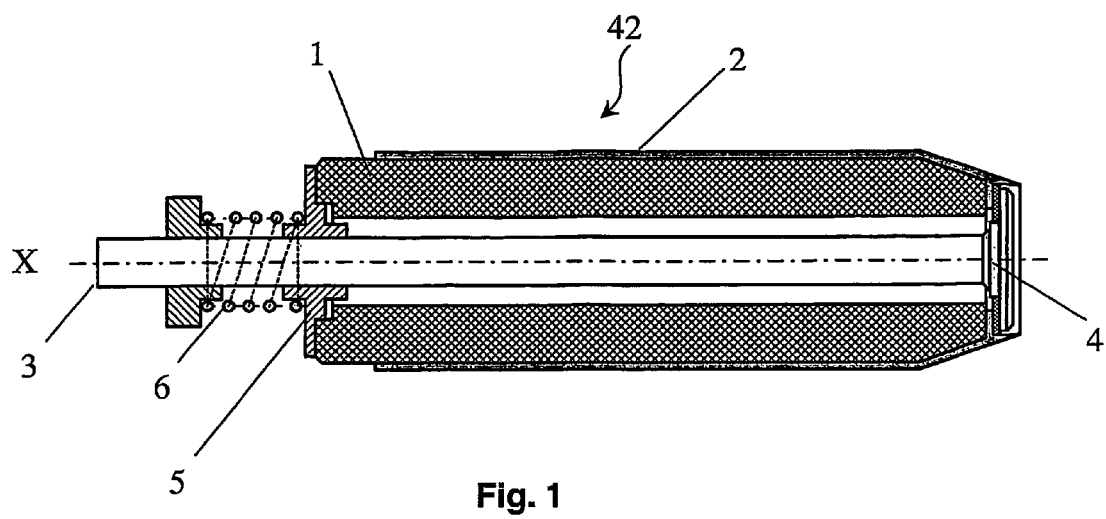
FIG. 1 is a side view of an embodiment of the present invention.

The mandrel of the present invention is preferably a Danner blowpipe/tube or Danner sleeve. According to an embodiment of the present invention the mandrel for producing a glass tube or rod comprises a self-supporting metal material jacket. This can avoid the drawbacks, which arise with composite products with different thermal expansion coefficients. As a result of the self-supporting structure thermal insulation material can be introduced inside the jacket, wherein the insulation material does not necessarily comprise similar thermal expansion coefficients as the metal jacket. This may provide a better insulation compared to other material which have to comprise similar thermal expansion coefficients like the metal jacket.

The self-supporting metal jacket comprises preferably an outer wall and an inner self-supporting structure. Preferably, the inner self-supporting structure comprises at least one support strut. It is further preferred that the inner self-supporting structure comprises at least one thrust or annular ring. It is even further preferred that the inner supporting structure is an embossed or corrugated plate made of a metal material substantially similar, or materials with similar expansion coefficients, to the metal material of the outer wall.

According to another embodiment of the present invention the mandrel for producing a glass tube or rod, comprises a body, wherein the body comprises a ceramic composite material, and an external metal material jacket surrounding at least a portion of said body, wherein the ceramic composite material has a substantially similar thermal expansion coefficient as the metal material of said jacket.

It is further preferred that the ceramic composite material is a bonded material. Preferably the ceramic composite material is a casting slip material, and even more preferred is that the ceramic composite comprises $MgO$—$MgAl_2O_4$.

It is even further preferred that the body and the metal jacket comprise at least a portion with an essentially cylindrical shape. Even further preferred is that the body and the metal jacket comprise at least a portion with conical shape. Even further preferred is that the entire body and the metal jacket comprise a conical shape. Even further preferred is that the body and the metal jacket is cylindrical at the rear end portion and conical at the front end portion.

Since the mandrel of the present invention is preferably used for the Danner process, the mandrel provides preferably an inner channel for blowing gas through and allows treating the inner surface of the glass tube with the gas.

Even further preferred is that the metal material jacket comprises a coating which is released upon contact with the inner surface of the tube. This generates and accumulates a coating on the inner surface of the tube.

Even further preferred is that the diameters from the rear end to the front end of the mandrel are equally conical or decreasing in diameter, wherein the front end and the rear end of the mandrel are defined with respect to the flow direction of the glass material. Since the mandrel is typically in rotation during use, the mandrel is preferably axially symmetrical along its longitudinal axis. It is further preferred that the mandrel comprises essentially at the front end a fixed bearing for rotating the mandrel around the longitudinal axis. Even further preferred is that the mandrel comprises essentially at the rear end a floating bearing, adapted for rotating the mandrel around the longitudinal axis.

In case that the mandrel comprises a ceramic composite body it is even further preferred that the mandrel comprises at the rear end a biasing means adapted for assuring a tight fit between the body and the jacket. Preferably the biasing means comprises at least one spring.

The present invention also relates to a system for producing a glass rod or tube with a Danner blow tube and comprises further a nozzle for dispensing a flow of glass to the surface of the Danner blowpipe at one end of said blowpipe at a relatively high temperature in order to form a glass film, which is removed or pulled at the other end in form of a tube.

Since the above described production processes for glass tubes or rods require high temperatures that put extreme chemical and physical stress on all system components, the present invention uses preferably platinum materials, which have the advantage of being much more resistant than ceramic materials.

Preferably the metal material comprises a PGM material. Even further preferred, the metal material comprises platinum alloy. It is further preferred that metal material comprises an oxide dispersion strengthened (ODS) platinum alloy. Even further preferred is that the metal material comprises 0.1 to 0.5, and more preferably 0.16 wt.-% of zirconium and/or yttrium oxide.

Systems made of platinum materials allow continuous glass production under uniform high-quality conditions over many months and years. This ensures a long life time, high economic efficiency and excellent glass quality. Preferred metal materials are Pt, Pt alloys and ODS—Pt materials (Oxid Dispersion Strengthened) such as FKS* Pt ("FKS"=German abbreviation for FeinKornStabilisiert= dispersion hardened) materials which can also be used for the coating of special ceramic components. The use of platinum provides further the following advantages: no contamination of the melted glass due to soluble and non-soluble foreign materials; high chemical resistance against aggressive glass melts (e.g., color enamels, special glasses); better chemical homogeneity of the melted glass; processing-suitable homogeneity of the melted glass due to great flexibility in the working temperature (up to approximately 1650° C.). Furthermore, precise forming and constant quantity specifications for processing is possible due to the high precision of the platinum components.

The mandrel according to the present invention has superior resistance to erosion by molten glass by providing the particularly descended surface of a mandrel for glass tube forming, which comes in contact with molten glass.

Referring now to the drawing, there is shown in FIG. 1 a mandrel 42 according to an aspect of the invention. The mandrel 42 comprises a body 1 made of ceramic composite material which is surrounded by an external metal material jacket 2 surrounding at least a portion, preferably a major portion of said ceramic composite material body 1. The ceramic composite material body 1 has substantially a similar thermal expansion coefficient as the metal material of the jacket 2. The preferred metal material is from the group of PGM (Platinum Group Material), and more preferably of ODS platinum and the used ceramic composite material has substantially a similar thermal expansion coefficient like the above platinum. Examples for ceramic materials having an adjustable coefficient of thermal expansion coefficient are: spinell materials comprising $MgO$—$MgAl_2O_4$. These ceramic composite materials could be bonded materials or casting slip materials with thermal expansion coefficients α between $9\times10^{-6}K^{-1}$-$15\times10^{-6}K^{-1}$ more preferably $10\times 10^{-6}K^{-1}$-$12\times10^{-6}K^{-1}$. The body 1 and the metal jacket 2 of the embodiment in FIG. 1 have preferably a cylindrical shape at the rear and comprise a portion with a conical shape at the front end which assists the drawing process at the front end.

As can be seen in FIG. 1 to FIG. 4, these examples of embodiments of a mandrel according to the invention are axially symmetrical along their longitudinal axis X. Furthermore, these embodiments comprise a tube 3 with an inner hollow channel for blowing gas through them, which assists the tube producing process or allows the treating of the inner surface of the tube with special gases. Another possibility for treating the inner surface of the glass tube is the coating of the metal jacket 2 which upon contact with an inside of the surface for the tube being produced is released and accumulates on the inside surface, thereby providing a coating onto the glass surface. Since the mandrel is rotating in the Danner process, all the embodiments shown in FIGS. 1 to 4 comprise bearings, which allow a rotation of the mandrel around its longitudinal axis X. The front end and the rear end are defined for all embodiments shown with respect to the flow direction of the glass. The mandrels comprise preferably a fixed bearing 4 at the front portion of the mandrel, and floating bearing 5 at the rear end. Due to the floating bearing 5, the mandrel can expand along its longitudinal axis without producing undesired stressing forces. The first embodiment, depicted in FIG. 1 comprises further a biasing means 6 in form of a spring, which ensures a tight fit between the body 1 and the metal jacket 2.

Figure 2:
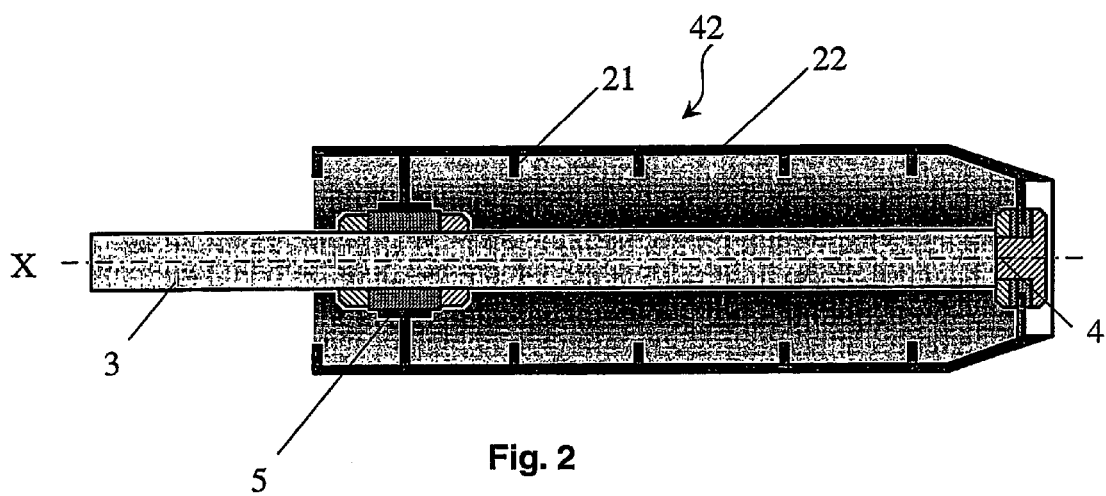
FIG. 2 is a side view of another embodiment of the present invention.

FIG. 2 relates to an embodiment of the present invention with a self-supporting construction. Due to the self-supporting construction there is no ceramic body inside the metal jacket 22 needed. The self-supporting metal jacket 22 has a metal layer which is stiff enough to resist the heat and forces during the glass producing process. The stiffness is further enhanced by an additional inner self-supporting structure. This inner self-supporting structure comprises at least one support strut. The support struts are preferably made of the same material, or at least similar material and/or material which comprises similar expansion coefficients like the metal jacket. According to a further aspect of the invention, the self-supporting structure comprises additionally or alternatively at least one thrust and/or at least one annular ring 21. Again, these self-supporting components comprise preferably a similar thermal expansion coefficient like the metal jacket. In case that the same material is used for the jacket and the support-structure, the mandrel may be manufactured integrally which may have a further advantage in view of the production process.

The self-supporting embodiments advantageously allow that thermal insulation material may be introduced between the tube 3 and the metal jacket 22, which provides a much better insulation than ceramic materials.

Figure 3:
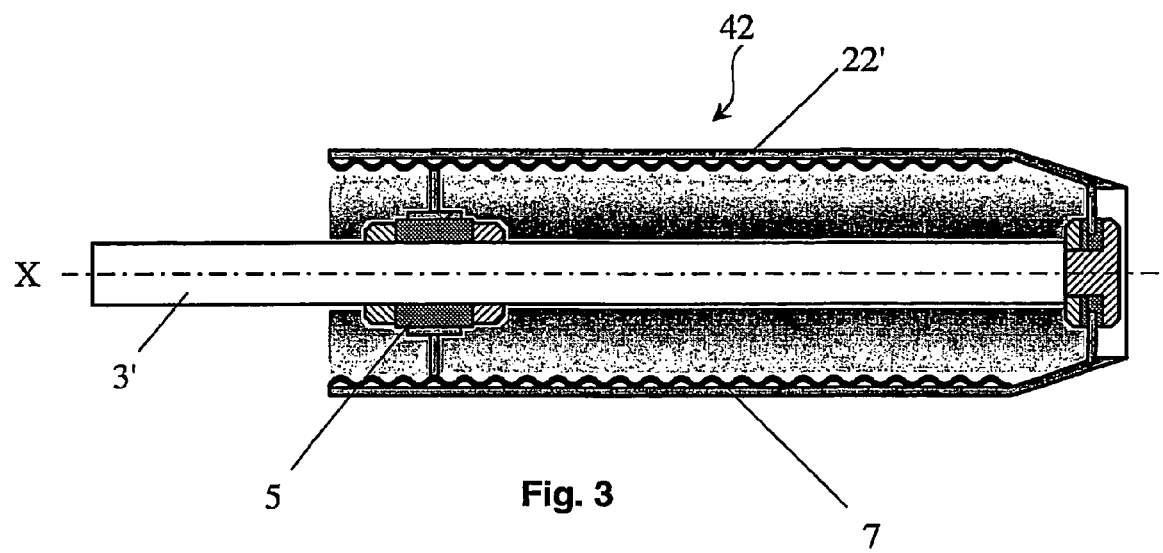
FIG. 3 is a side view of still another embodiment of the present invention.
Figure 4:
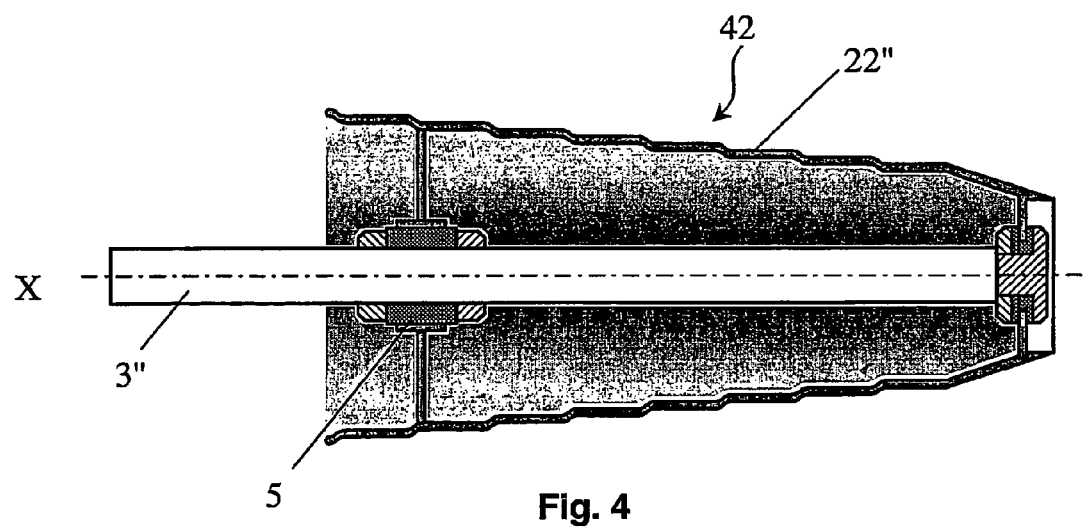
FIG. 4 is a side view of a further embodiment of the present invention.

According to another preferred embodiment as shown in FIG. 3, the inner supporting structure comprises an embossed or corrugated plate 7 made of metal material. The metal of the support structure comprises preferably a similar thermal expansion coefficient like the metal jacket. Preferably, the metal of the support structure is substantially similar to the metal material of the outer wall. Another preferred embodiment of a self-supporting mandrel is depicted in FIG. 4. In this embodiment, the mandrel is formed so that the diameters of the mandrel from the rear end to the front end are either conical or continuously decreasing.

The detailed description above is intended only to illustrate certain preferred embodiments of the present invention. It is in no way intended to limit the scope of the invention as set out in the claims.

What is claimed is:

1. A mandrel for producing a glass tube or rod, wherein said mandrel has an outer surface and said mandrel comprises a self-supporting metal material jacket, the self-supporting metal material jacket comprising an outer wall and an inner self-supporting structure, wherein the outer wall comprises an oxide dispersion strengthened platinum alloy, and the inner self-supporting structure comprises at least one support strut and at least one annular ring, wherein the at least one support strut comprises a metal material and wherein the outer wall of the self-supporting metal material jacket forms the outer surface of the mandrel.

2. The mandrel for producing a glass tube or rod according to claim 1, wherein the inner self-supporting structure comprises a plurality of support struts.

3. The mandrel according to claim 1, wherein the mandrel comprises at a rear end a biasing means adapted to assure a tight fit between a body and the jacket.

4. The mandrel according to claim 3, wherein the biasing means comprises at least one spring.

5. The mandrel according to claim 1, wherein the mandrel is axially symmetrical along its longitudinal axis.

6. The mandrel according to claim 1, wherein the mandrel is a Danner blowpipe/tube or Danner sleeve.

7. The mandrel according to claim 1, wherein the mandrel provides an inner channel for blowing gas through and allows treating the inside surface of the glass tube with at least one gas.

8. The mandrel according to claim 1, wherein the metal material jacket comprises a coating which upon contact with an inside surface of the tube being produced is released and accumulates on the inside surface to form a coating thereon.

9. The mandrel according to claim 1, wherein the mandrel has a front end and a rear end with respect to the flow direction of a glass material and wherein diameters from the rear end to the front end are equally conical or decreasing.

10. The mandrel according to claim 9, wherein the mandrel comprises essentially at the front end a fixed bearing adapted to rotate the mandrel around an axis.

11. The mandrel according to claim 9, wherein the mandrel comprises essentially at the rear end a floating bearing, adapted to rotate the mandrel around an axis.

12. The mandrel of claim 1 further comprising a thermal insulation material, wherein the thermal insulation material is inside the metal material jacket.

13. The mandrel of claim 12, wherein the thermal insulation material has a thermal expansion coefficient that is not similar to a thermal expansion coefficient of the self-supporting metal material jacket.

* * * * *